Patented Aug. 13, 1940

2,211,632

UNITED STATES PATENT OFFICE 2,211,632

VULCANIZATION OF RUBBER

George W. Watt, Akron, Ohio, assignor to Wingfoot Corporation, Wilmington, Del., a corporation of Delaware No Drawing. Application March 26, 1937,
Serial No. 133,284

11 Claims. (Cl. 260—793)

This invention relates to the vulcanization of rubber and more particularly to a method of accelerating this vulcanization by the use of compounds not hitherto employed for this purpose. The invention also includes the products produced by the process.

Many substances have been employed to control the speed of the vulcanization of rubber and to influence the characteristics of the product obtained. These materials differ greatly in kind and characteristics and offer a wide variety of effects, sometimes being employed alone, sometimes in combination with each other.

The present invention involves the discovery of a new class of compounds which are excellent accelerators. Some of them may be employed either by themselves or in conjunction with basic activators, others are such powerful accelerators that the presence of an activator is not desirable, while still others are preferably used in conjunction therewith. These new accelerators may be obtained by reacting a thiuronium halide with a water-soluble salt of a di thio acid. In most cases, judging by melting points and analyses, they appear to be definite chemical compounds but their exact constitution is not known. They may be represented by any one of the three following formulae, it not being known to which, if any of these, the compounds actually conform, although it is believed that they correspond to the first:

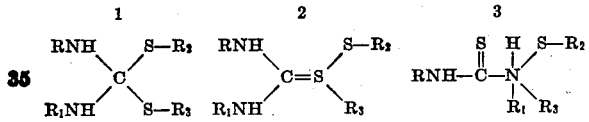

In these formulae R and $R_1$ may be hydrogen or alkyl, aralkyl, alicyclic, aryl groups or substitution products thereof. They may be the same or different radicals. $R_2$—S— is a dithiocarboxylate radical such as a dithiocarbamyl or a xanthyl group or the residue of any other dithiocarboxylic acid. $R_3$ is an organic radical such as an alkyl, alicyclic, aralkyl, carboxyalkyl or aromatic acyl radical.

The accelerators of the invention are conveniently prepared by bringing the desired thiuronium halide into reaction with an alkali metal or other water-soluble salt of the dithio acid. Alkali metal halide is eliminated and the desired product formed. The reaction is preferably carried out in solution, convenient solvents being water, alcohol, acetone and mixtures of the same. Although not necessary, it is generally preferable to conduct the reaction at a temperature in the neighborhood of 0–10° C.

The thiuronium halides are well known compounds, many examples of which have been described in the literature (see for example, Werner, J. Chem. Soc. 57, 283–304; Lecher & Hueck, Annalen, 438, 169–184; and Donleavy, J. Amer. Chem. Soc. 58, 1004—1005). Such compounds are formed when thiourea or substituted thioureas are permitted to react with organic halides. Illustrative are S-benzyl thiuronium chloride, S-(o-, m-, or p-methyl benzyl) thiuronium chloride, S-(carboxy methyl) thiuronium chloride, S-n-butyl thiuronium bromide, S-benzyl N-cyclohexylthiuronium chloride, S-methylthiuronium chloride, S-ethylthiuronium iodide, S-(carbethoxy methyl) thiuronium chloride, S-allylthiuronium bromide, S-benzyl-N-methylthiuronium chloride, S-benzyl-NN'-dicyclohexylthiuronium chloride, etc. Other thiuronium halides, which may be employed in producing the accelerators of the invention, may be formed from such thioureas as mono para ethoxy cyclohexyl thiourea, monohexahydro o- or p-tolyl thiourea, monoxylyl thiourea, monomethyl thiourea, monoethyl thiourea, N-N'-diethyl thiourea, monobutyl thiourea, di-N-N'-(p-methoxy cyclohexyl) thiourea, etc. The following organic halides are representative of those which may be reacted with the thiourea: n-heptyl bromide, n-amyl bromide, n-propyl bromide, hexahydro benzyl chloride, o-, m- or p-nitro benzyl chloride, para chlor benzyl chloride, o-, m- or p-ethoxy benzyl chloride, o-methoxy benzyl chloride, mono halogenated aliphatic carboxylic acids, such as alpha chlor propionic acid and alpha brom butyric acid, alpha chlor ethyl propionate, alpha brom methyl butyrate, chlor methyl acetate, chlor butyl acetate, chlor propyl acetate, dichlor acetic acid and the like.

Any dithio acid, preferably in the form of an alkali metal or other water-soluble salt, such as the sodium, potassium and ammonium salts, may be employed. Included among these are the dithiocarbamic acids, such as N-butyl dithiocarbamic acid, benzyl dithiocarbamic acid, beta phenethyl dithiocarbamic acid, phenyl dithiocarbamic acid, ethyldithiocarbamic acid, cyclohexyl dithiocarbamic acid, para tolyl dithio carbamic acid, alpha furfuryl dithiocarbamic acid, para ethoxy cyclohexyl dithio carbamic acid, allyl dithiocarbamic acid, methyl ethyl dithiocarbamic acid, di-isopropyl dithio-carbamic acid, dihexyl dithiocarbamic acid, dicyclohexyl dithiocarbamic acid, tetrahydro alpha furfuryl cyclohexyl dithiocarbamic acid, methyl phenyl dithiocarbamic acid, etc. Also included are the xanthogenic acids, such as methyl xanthogenic acid, ethyl xanthogenic acid, amyl xanthogenic acid, etc. Other representative dithio acids are dithiofuroic, dithiobenzoic, dithioacetic, dithiolauric, dithiooleic, dithio acrylic, dithiocrotonic, phenyl dithioacetic, ortho amino dithiobenzoic, dithiosalicylic, etc.

The following examples illustrate the preparation of the materials of the invention:

*Example 1.*—Diamino(benzyl mercapto)methyl-1-dithiopiperidine carboxylate was prepared as follows: 30.5 parts of S-benzylthiuronium chloride were dissolved in 500 cc. of water, stirred mechanically, cooled to 10° C. and treated dropwise with 27.5 parts of the sodium salt of pentamethylene dithiocarbamic acid dissolved in 500 cc. of water cooled to 10–15° C. The bulky white precipitate was filtered off, washed with cold water, and air-dried. Yield, 40.5 grams or 82% of the theoretical. M. P., 112–4°. Anal. Calcd. for $C_{14}H_{21}N_3S_3$: S, 29.3. Found: S, 28.7. The formula is therefore assumed to be:

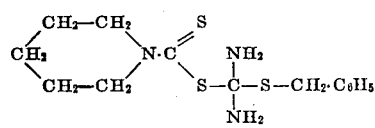

*Example 2.*—Diamino(carboxymethylmercapto)methyl-1-dithiopiperidine carboxylate was prepared as follows: 34.1 parts of S-carboxymethyl-thiuronium chloride were dissolved in 300 cc. of water, stirred mechanically, cooled to −5° C. and treated dropwise with a solution of 36.6 parts of the sodium salt of pentamethylene dithiocarbamic acid in 300 cc. of water cooled to 0° C. The white precipitate was filtered immediately, washed with ice-water and air-dried. Yield, 45.5 grams or 77% of the theoretical. M. P., 203–4°. Anal. Calcd. for $C_9H_{17}O_2N_3S_3$: N, 14.2. Found: N, 15.1. The formula is therefore assumed to be:

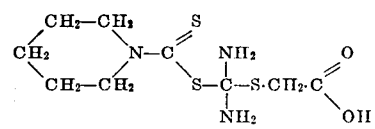

*Example 3.*—Diamino(n-butylmercapto)methyl-1-dithio-piperidine carboxylate was prepared as follows: 21.3 parts of S-n-butyl-thiuronium bromide were dissolved in 100 cc. of water, stirred mechanically, cooled to 0° C. and treated dropwise with a solution of 18.3 parts of the sodium salt of pentamethylene dithiocarbamic acid in 100 cc. of water cooled to 5° C. The white precipitate was filtered off, washed with ice water and air-dried. Yield, 24.5 grams or 84% of the theoretical. M. P., 106–7°. Anal. Calcd. for $C_{11}H_{23}N_3S_3$: N, 14.3; S, 32.8. Found: N, 14.2; S, 32.1. The formula is therefore assumed to be:

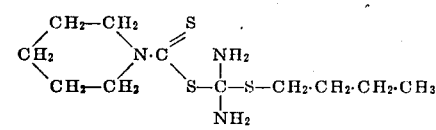

*Example 4.*—Diamino(allylmercapto)methyl-1-dithiopiperidine carboxylate was prepared as follows: 28 parts of S-allylthiuronium bromide were dissolved in 100 cc. of water, stirred mechanically, cooled to 0° C. and treated dropwise with a solution of 26 grams of the sodium salt of pentamethylene dithiocarbamic acid in 100 cc. of water cooled to 0° C. The white, bulky precipitate was filtered, washed with cold water and air-dried. Yield, 34 grams or 87% of the theoretical. M. P., 102–3°. Anal. Calcd. for $C_{10}H_{19}N_3S_3$: S, 34.6. Found: S, 33.8. The formula is therefore assumed to be:

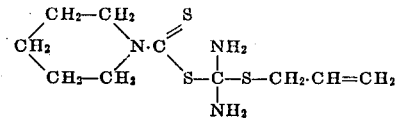

*Example 5.*—Twenty and three-tenths parts of S-benzylthiuronium chloride were dissolved in 200 cc. of water, stirred, cooled to 5° C., and treated with 100 parts of an aqueous solution of sodium dithiobenzoate (concentration unknown) cooled to 5° C. A gummy orange-red product separated, but as the addition of the sodium dithiobenzoate solution was continued, the product crystallized to an orange-red solid. This was filtered off, washed with water, and dried in vacuo over sulfuric acid. Yield, 11.0 grams or 34%. M. P., 106–11° (with decomposition). This product consists largely of a substance having the formula:

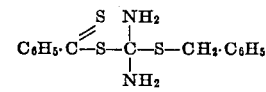

*Example 6.*—Twenty-two parts of S-benzylthiuronium chloride were dissolved in 200 parts of water, stirred, cooled to 5° C. and treated dropwise with a solution of 16.1 parts of ammonium dithiopyromucate in 100 parts of water. The orange-colored precipitate was filtered off, washed with cold water and dried. Yield, 31.5 parts, or 100%. M. P. 136–7°. Anal. Calcd. for $C_{13}H_{14}ON_2S_3$: N, 9.0; S, 31.0. Found: N, 9.3; S, 31.5. Hence the formula is assumed to be:

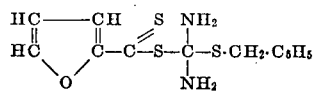

*Example 7.*—Twenty-two parts of S-benzylthiuronium chloride were dissolved in 200 parts of water, stirred, cooled to 5° C., and treated dropwise with a solution of 16 parts of potassium ethyl xanthate in 50 parts of water. The white precipitate was filtered off, washed with cold water, and dried. Yield, 27.5 parts or 95% of the theoretical. M. P. 93–4°. Probable formula:

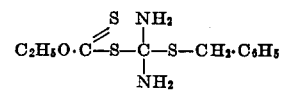

Other useful materials may be similarly prepared by employing other thiuronium halides and other dithio acids for those used in the foregoing examples. Also if desired, other methods of preparation may be employed, since it is intended to include the products of the type described however they may be prepared.

The materials of the invention may be employed in most or all of the usual compounding formulae. The following is one in which they have yielded very good results and which may be employed to demonstrate their efficiency:

| | |
|---|---|
| Smoked sheet | 100 |
| Zinc oxide | 5 |
| Sulfur | 3 |
| Accelerator | As noted |

Samples were compounded in accordance with the foregoing formula, cured, and tested. The following data are the results obtained at the optimum cure (as determined by hand tests) in the range tested.

In the following table the materials used are:
- A Diamino(benzylmercapto) methyl - 1 - dithiopiperidine tested.
- B Diamino(carboxymethylmercapto) methyl-1-dithiopiperidine carboxylate.
- C Diamino(n - butylmercapto) methyl - 1 - dithiopiperidine carboxylate.
- D Diamino(allylmercapto) methyl-1-dithiopiperidine carboxylate.
- E Diamino(benzylmercapto) methyl dithiobenzoate.
- F Diamino(benzylmercapto) methyl dithiopyromucate.
- G 2-mercaptobenzothiazole.
- H Diamino(benzylmercapto) methyl ethyl xanthate.

| Accelerator | Amount | Cure Min. at °F. | | Tensile brk., kg./cm.² | Ult. elong., percent | Modulus | |
|---|---|---|---|---|---|---|---|
| | | | | | | 500% | 700% |
| A | 0.30 | 60 | 240 | 136 | 870 | 15 | 48 |
| B | 0.50 | 40 | 240 | 136 | 770 | 25 | 86 |
| C | 0.50 | 10 | 240 | 165 | 790 | 26 | 99 |
| D | 0.30 | 10 | 260 | 136 | 850 | 17 | 61 |
| E | 0.50 | 180 | 283 | 80 | 850 | 13 | 35 |
| F | 0.50 | 10 | 240 | 184 | 720 | 40 | 162 |
| G | 0.50 | 40 | 260 | 136 | 820 | 20 | 67 |
| H | 0.50 | 80 | 285 | 108 | 500 | 20 | 62 |
| | 0.20 | Diphenylguanidine. | | | | | |

It will be apparent that the accelerators of the invention are adapted for use in many rubber products. They accelerate the vulcanization of rubber at very low temperatures and have a good curing range. Although it is not desirable in all cases, many of them may be used in conjunction with basic nitrogen-containing accelerators of which diphenylguanidine is merely illustrative. Others are diortho tolyl guanidine, benzyl amine, 2-4-diamino diphenylamine, p-p'-diamino diphenylmethane, diphenyl guanidine neutral phthalate, diphenylguanidine neutral succinate, urea, urea succinate, and the like. Comparative testing data for the widely used commercial accelerator, 2-mercaptobenzothiazole, are presented, which further show the excellent accelerative properties of the compositions of the invention.

It is intended that the patent shall cover, by suitable expression in the appended claims all features of patentable novelty residing in the invention.

I claim:

1. A method of treating rubber which comprises vulcanizing it in the presence of a thiuronium dithiocarboxylate.
2. A method of treating rubber which comprises vulcanizing it in the presence of a thiuronium xanthate.
3. A method of treating rubber which comprises vulcanizing it in the presence of a thiuronium dithiocarbamate.
4. A method of treating rubber which comprises vulcanizing it in the presence of a basic nitrogen-containing accelerator and a thiuronium dithiocarboxylate.
5. A rubber product which has been vulcanized in the presence of a thiuronium dithiocarboxylate.
6. A rubber product which has been vulcanized in the presence of a thiuronium xanthate.
7. A rubber product which has been vulcanized in the presence of a thiuronium dithiocarbamate.
8. A rubber product which has been vulcanized in the presence of a basic-nitrogen containing accelerator and a thiuronium dithiocarboxylate.
9. As new compositions of matter, thiuronium dithiocarboxylates.
10. As new compositions of matter, thiuronium xanthates.
11. As new compositions of matter, thiuronium dithiocarbamates.

GEORGE W. WATT.

CERTIFICATE OF CORRECTION.

Patent No. 2,211,632. August 13, 1940.

GEORGE W. WATT.

It is hereby certified that error appears in the printed specification of the above numbered patent requiring correction as follows: Page 3, first column, line 6, for the word "tested" read --carboxylate--; line 28, in the table, fourth column thereof, for "283" read --285--; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.